UNITED STATES PATENT OFFICE.

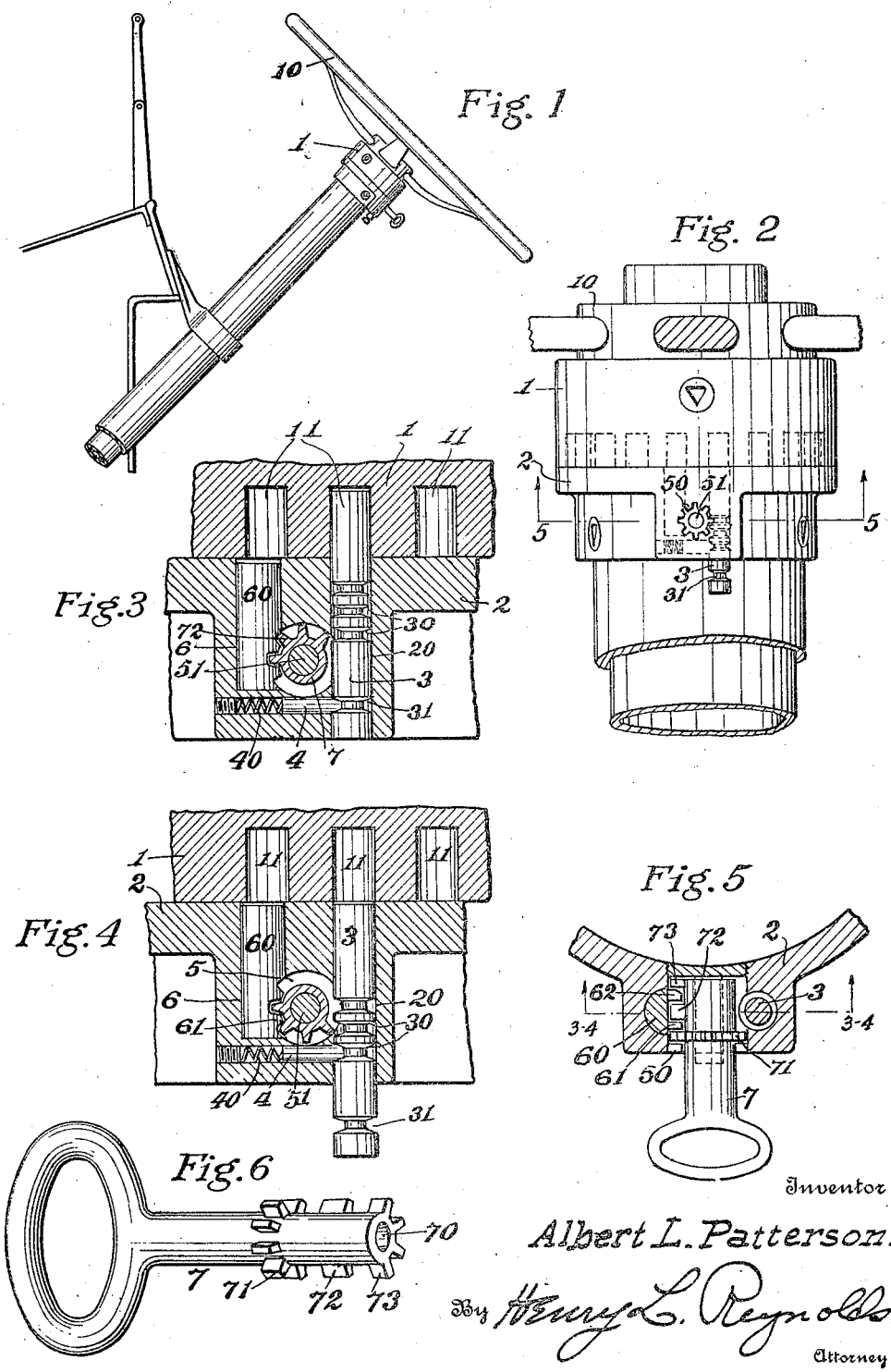

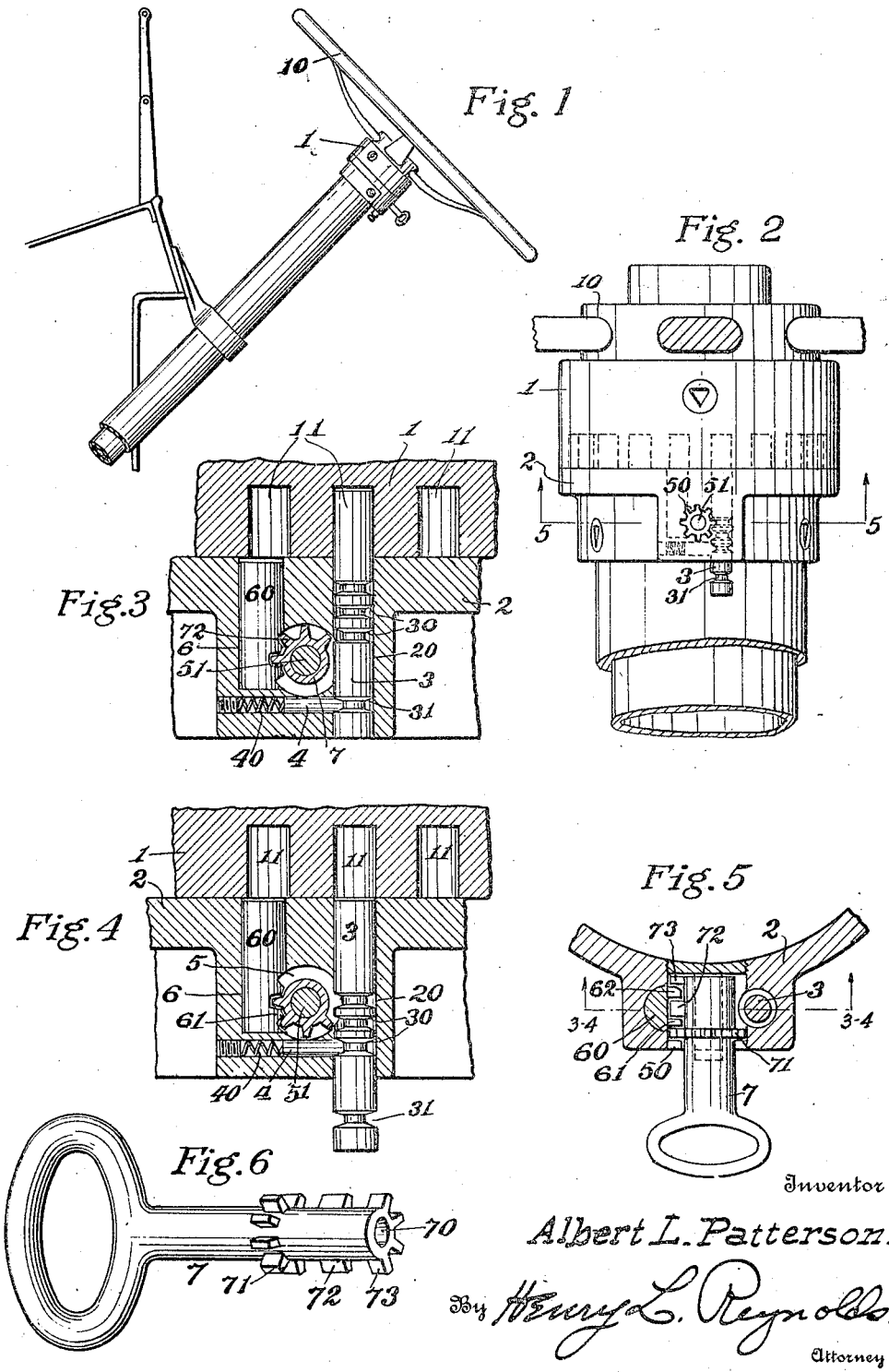

ALBERT L. PATTERSON, OF SEATTLE, WASHINGTON.

STEERING-HEAD LOCK.

1,287,089.  Specification of Letters Patent.  Patented Dec. 10, 1918.

Application filed March 28, 1918. Serial No. 225,319.

*To all whom it may concern:*

Be it known that I, ALBERT L. PATTERSON, a citizen of the United States, and resident of the city of Seattle, county of King, and State of Washington, have invented certain new and useful Improvements in Steering-Head Locks, of which the following is a specification.

My invention relates to a means for locking the steering heads of automobiles so that the same cannot be operated until it has been unlocked by the use of a suitable key.

The object of my invention is to provide a means to prevent any unwarranted use of automobiles and to do this in a simple and convenient manner and by means of mechanism, which is inexpensive of construction.

My invention comprises the novel features which will be hereinafter described and then particularly pointed out in the claims.

The accompanying drawings illustrate my invention embodying the device in a type of construction which is now preferred by me.

Figure 1 is a side view of the steering head of an automobile, showing the location of my device relative to the other parts.

Fig. 2 is a side view of the parts immediately associated with my invention.

Figs. 3 and 4 are sections taken upon the lines 3—4, 3—4 of Fig. 5, showing the locking bolts respectively, in locked and unlocked position.

Fig. 5 is a fragmentary section taken on the line 5—5 of Fig. 2.

Fig. 6 shows the locking key in perspective.

In carrying out my invention I provide a collar 1 which is secured to, or forms a part of, the steering wheel 10, or in any other convenient and suitable manner, is mounted so that it turns with a steering member of the automobile. The preferred form of construction is to secure this upon the boss of the steering wheel. This collar 1 has an end face which is provided with a series of bolt-receiving holes 11. These are spaced fairly close together and are intended for the reception of a locking bolt.

I provide a complemental collar 2 which is secured in fixed position and has an end face complemental to the end face of the collar 1, and has therein a bore 20 located so as to be registrable with the holes 11 in the rotatable collar. In this bore 20 is mounted a locking bolt 3, which locking bolt has a series of teeth 30 therein forming a short rack. I also provide means whereby this bolt may be held against reciprocation lengthwise unless a material effort is applied thereto.

The means herein shown consist of the groove or notch 31 which is engaged by a dog 4 mounted to reciprocate in a bore in the collar 2, and yieldingly held toward the locking bolt by means of a spring 40. The side edges of the groove 31 and the corresponding end surfaces of the dog 4 are beveled so that a material pressure applied to the locking bolt will cause it to move lengthwise.

The locking dog 4 engages the groove 31, which is at the outer end of the bolt when the bolt is in locking position, and engages with one of the grooves 30 which form the rack teeth upon the bolt, when the bolt is withdrawn or in unlocked position. In this position the lower end of the bolt projects below the lower surface of the collar 2.

To lock the steering head it is only necessary to turn the wheel 10 so as to bring one of the holes 11 thereof into registry with the locking bolt and then insert the bolt therein by an upward pressure of this bolt. When one of the holes 11 is brought into register with the bolt, the bolt will slide upward, thus locking the head in position, and the dog 4, engaging the groove 31 in the lower end of the bolt, will prevent its being withdrawn by external engagement.

Preferably the outer end of the locking bolt 3 is made so that it either comes flush with the lower outer surface of the collar 2, or enters slightly beyond the same, and the shape is such that it is practically impossible to get hold of the same to withdraw it.

The collar 2 has a key-receiving bore 5, the same being located so as to intersect the bolt-receiving bore 20. It also has a bore 6 which intersects the key-receiving bore on the side opposite that of the bolt-receiving bore. At the outer end of the key-receiving bore are a number of teeth 50 projecting inward to form what is in effect an internally toothed gear or pinion. These constitute selective members of the locking service.

I also prefer to provide, located in the axis of the key-receiving bore, a pin 51 which is designed to enter a bore 70 in the shank of the key 7, thereby furnishing a steady support for the same while it is being used. The bore 6 has a pin or bolt 60 therein which is fixedly secured and which is cut away in the part thereof which intersects the key-receiving bore in such a manner as to form two sets of inwardly projecting teeth 61 and 62. These two sets of teeth are separated by a groove which is adapted to receive and to permit the free turning of the teeth on the key which engage to operate the locking bolt. The key, which is shown in perspective in Fig. 6, has a set of teeth 71 located toward the handle end thereof, which are shown as forming a complete circle, that is, extend all about the shank. It also has two other interrupted or segmental sets of teeth 72 and 73, these being located nearer to the entering end of the key. The central set of teeth 72 are the ones relied upon in the construction illustrated, for operating the bolt 3.

When the bolt is in locked position, or as shown in Fig. 1, the key can only be inserted if it be turned in such manner that the portion of the key wherein the two inner sets, 72 and 73, of teeth are missing, be placed toward the bolt 3. When so inserted, if the key be turned left-handedly, the interrupted set of teeth 72 will engage the teeth 30 on the bolt and throw the bolt up or down, as the case may be.

When the key is in place, the relative position of the various sets of teeth thereon and the teeth which are formed on the bolt 60, is as shown in Fig. 5. Normally, or when the steering head is free, the locking bolt would have its lower end slightly projecting, as shown in Fig. 4.

To lock the steering head, it is only necessary to press up with the finger on the bolt, as is shown in the locked position, without the use of a key. It cannot, however, be withdrawn without the use of a key.

While I have shown the teeth 50 at the outer end of the key-receiving hole as being regularly proportioned so as to resemble a small pinion, it is evident that the teeth and the notches may be arranged in any relation and shape desired and thus make it impossible for the key for one automobile to fit the key of another. In this manner the selective feature of the lock may be provided for. The manner of doing this would be well understood by any person conversant with locks and its detailed illustration is not deemed necessary.

What I claim as my invention is:

1. A lock for steering heads of automobiles comprising a collar rotatable with the steering shaft and having a series of bolt-receiving recesses in its end face, a fixed block having a face engaging said end face of the rotatable collar and having a bolt-receiving bore adapted to register with the recesses of the collar, a bolt in said bore having teeth on its side, means for yieldingly holding the bolt to prevent reciprocation, a removable key having a plurality of peripherally disposed sets of teeth thereon, the outermost extending entirely around its shank and the innermost being segmental, the block having a bore for reception of the key and having teeth extending into said bore and positioned to lie between the toothed segments of the key when the latter is in working position.

2. A lock for steering heads of automobiles comprising a collar mounted to turn with the steering wheel and having an end face provided with a series of bolt-receiving holes, a fixed collar having a complemental end face and a bolt-receiving bore adapted to be registered with the bores in the other collar, a locking bolt in the latter bore having teeth therein forming a rack, a spring held pawl adapted to engage a tooth of the locking bolt to yieldingly hold it against movement, a key receiving bore in the fixed collar intersecting the bolt-receiving bore and said collar having teeth projecting into said bore at and extending about its outer end and other inwardly projecting teeth inward from its outer end, and a removable key having a plurality of sets of teeth thereon adapted to mesh with the said other teeth and with the teeth of the locking bolt to reciprocate said bolt.

3. A lock for steering heads of automobiles comprising a collar mounted to turn with the steering wheel and having an end face provided with a series of bolt-receiving holes, a fixed collar having a complemental end face and a bolt-receiving bore adapted to be registered with the bores in the other collar, a locking bolt in the latter bore having teeth therein forming a rack, a spring-held pawl adapted to engage a tooth of the locking bolt to yieldingly hold it against movement, a key receiving bore in the fixed collar intersecting the bolt-receiving bore, said collar having teeth projecting into said bore at its outer end, said fixed collar having another bore intersecting the side of the key-receiving bore, a plug in the latter bore having teeth projecting into said bore and conforming in spacing with those at the entrance of the key-receiving bore, and a key having thereon a plurality of sets of teeth spaced to mesh with those of the key-receiving bore and of the locking bolt, the innermost of said sets occupying segments only of its periphery.

Signed at Seattle, Washington, this 23d day of March, 1918.

ALBERT L. PATTERSON.